Patented Sept. 28, 1943

2,330,601

UNITED STATES PATENT OFFICE 2,330,601

ARC WELDING LOW-CARBON STEEL WITH A CARBON ELECTRODE

Bernard M. Larsen, Elizabeth, N. J., assignor to United States Steel Corporation of Delaware, a corporation of Delaware No Drawing. Application April 22, 1942, Serial No. 440,101

2 Claims. (Cl. 219—10)

This invention is concerned with arc welding low-carbon steel with a carbon electrode, the object being to do this without the low-carbon steel permanently acquiring carbon from the electrode.

Generally speaking, it is always an advantage for the weld between low-carbon steel pieces to have a carbon content not substantially higher than the pieces themselves, since this provides a unit having throughout the same physical properties, such as the same hardness.

For example, if low-carbon steel strip coils are welded end-to-end to permit this material being cold rolled continuously without mill stoppages, the welds between the ends must not contain substantially more carbon than does the strip itself, since the welds would then mark the rolls of the cold mill. At the same time, it is desirable to make welds of this character by the arc welding method and apparatus disclosed by Patent No. 2,173,450, which issued to B. M. Larsen et al. on September 19, 1939, and which involves the use of a carbon electrode. This patented method and apparatus permits thin low-carbon steel parts to be welded together with great accuracy, which is particularly desirable in connection with the strip end welding described, but, at the same time, the method and apparatus involves the use of a carbon electrode which inherently has the characteristic of adding carbon to the weld, which is particularly undesirable in such instances because of the roll marking problem.

With the foregoing in mind, the present invention is a method of arc welding low-carbon steel with a carbon electrode, and which is characterized by covering the welding zone with an oxidizing slag and working the arc therethrough to prevent the steel from permanently acquiring carbon from the electrode. The slag fuses and floats on the metal fused by the carbon electrode, the slag functioning to prevent the carbon reaching the steel and, at the same time, to remove excess carbon from the fused steel should the steel acquire carbon from the electrode in spite of the protective action of the slag. Suitable slags are $CaO.Fe_2O_3$ mixtures, or finely divided $Fe_2O_3$ or $Fe_3O_4$. Iron ores and mixtures of $MnO_2$ and $Fe_2O_3$ may also be included. The composition and amount of the oxidizing slag should be adjusted to prevent the fused steel from picking up material amounts of carbon, so that as the welding progresses, the solidifying fused steel will not have a materially higher carbon content than it had originally, even though the fused metal solidifies and is quenched very rapidly, such as might occur in the case of thin parts positioned by relatively massive clamps capable of rapidly absorbing the welding heat.

When the principles of the aforementioned patent are applied to the butt welding of thin, low-carbon steel strip so as to permit strip rolling without mill stoppages, the strip ends are suitably butted by clamping means capable of providing the accuracy required in such instances. The butted ends are then covered with the oxidizing slag and the principles of the patent applied. Thus, a carbon electrode is spaced from the steel parts, and a current is applied to the electrode and the work with sufficient potential to produce a pilot spark therebetween through the slag. Prior to cessation of this spark, the arc welding current is applied to the electrode and the work to cause an arc to follow the spark through the slag and fuse the steel and the slag, the latter then preventing the steel from permanently acquiring carbon from the electrode. Of course, this action is repeated as the electrode travels along the welding line, in the manner described in the patent. The slag does not interfere with the accuracy of the pilot spark nor does it deflect the arc which follows this spark. Any of the slags previously described may be used for this application, the exact composition and amount being necessarily determined by experiment.

I claim:

1. A method of arc welding low-carbon steel with a carbon electrode, characterized by covering the welding zone with an oxidizing slag, and working the arc therethrough to prevent the steel from permanently acquiring carbon from the electrode.

2. A method of arc welding low-carbon steel with a carbon electrode, characterized by covering the welding zone with an oxidizing slag, spacing the electrode adjacent the covered zone, applying current to the electrode and the work with sufficient potential to produce a pilot spark therebetween through the slag, and prior to cessation of this spark applying the arc welding current to the electrode and the work to cause an arc to follow the spark through the slag and fuse the steel and the slag, the latter preventing the steel from permanently acquiring carbon from the electrode.

BERNARD M. LARSEN.